(12) United States Patent
Seidel

(10) Patent No.: US 6,478,253 B1
(45) Date of Patent: Nov. 12, 2002

(54) AIRFRAME HAVING AREA-RULED FUSELAGE KEEL

(75) Inventor: Gerhard E. Seidel, Renton, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/839,260

(22) Filed: Apr. 20, 2001

(51) Int. Cl.$^7$ ................................................. B64C 1/00
(52) U.S. Cl. .................. 244/119; 244/118.5; 244/118.1
(58) Field of Search .......................... 244/117 R, 118.5, 244/119, 121, 130, 118.6, 118.1

(56) References Cited

U.S. PATENT DOCUMENTS

| | | | | |
|---|---|---|---|---|
| 2,874,922 A | * | 2/1959 | Whitcomb | 244/130 |
| 5,115,999 A | * | 5/1992 | Buchsel et al. | 244/118.5 |
| 5,899,413 A | * | 5/1999 | Hager et al. | 244/130 |
| 5,992,797 A | * | 11/1999 | Seidel et al. | 244/118.5 |
| 6,149,101 A | | 11/2000 | Tracy | |

FOREIGN PATENT DOCUMENTS

JP          403292290 A  * 12/1991  ............. B64C/1/00

* cited by examiner

*Primary Examiner*—Michael J. Carone
*Assistant Examiner*—Gabriel S Sukman
(74) *Attorney, Agent, or Firm*—Alston & Bird LLP

(57) ABSTRACT

An aircraft having a fuselage and a wing employs area-ruling of the fuselage in a vertical direction, with at least a substantial amount of the area-ruling being accomplished by dishing the keel area of the fuselage directly below the center portion of the wing. In one embodiment the aircraft has a main passenger seating deck and forward and aft upper seating decks located above the main deck respectively forward and aft of the wing, and both the upper surface of the fuselage above the wing and the lower surface of the fuselage below the wing are area-ruled.

11 Claims, 4 Drawing Sheets

AIRFRAME HAVING AREA-RULED FUSELAGE KEEL

FIELD OF THE INVENTION

The invention relates to aircraft. The invention relates more particularly to aircraft having an area-ruled fuselage to reduce drag of the aircraft at high subsonic Mach numbers.

BACKGROUND OF THE INVENTION

It is well known that as an aircraft approaches the high subsonic flight regime, there is a steep rise in aircraft aerodynamic drag. The onset of the rise in drag results from local regions of sonic or supersonic flow that occur on parts of the aircraft because of the contour of the aircraft surfaces; such regions of locally sonic or supersonic flow typically arise at flight Mach numbers of about 0.8 or so for many aircraft. As the Mach number is increased beyond this threshold, the drag begins to rise at a steep rate.

It is known that the onset of this drag rise can be delayed to a higher Mach number by careful design of the aircraft fuselage and wing. In particular, it is known that so-called area-ruling of the aircraft fuselage can be effective in delaying the onset of the transonic drag rise. In accordance with this technique, the fuselage in the vicinity of the fuselage-wing interface is contoured so as to locally reduce the fuselage cross-section to compensate for the cross-section of the wing. The objective in area-ruling of a fuselage generally is to avoid a steep gradient in the total cross-sectional area of the aircraft in the longitudinal direction. Thus, the fuselage preferably has a relatively larger cross-sectional area forward and aft of the wing than it has in the area of the wing. As an example, the familiar "coke-bottle" shaped fuselage has been employed for military fighter aircraft, in which the fuselage is narrowed in the horizontal direction at the fuselage-wing interface.

Area-ruling of the fuselage of a passenger aircraft involves a number of design considerations, not the least of which is the desire to provide adequate space for the passengers so that they will not be cramped. Unfortunately, the desire to area-rule the fuselage in the vicinity of the wing is at odds not only with the need to maintain adequate passenger seating space but also with other design features in this part of the aircraft. For instance, traditionally the wing-fuselage intersection of a low-wing passenger transport aircraft includes a large fairing defining the lower aerodynamic surface of the fuselage in the area below the center portion of the wing that passes through the fuselage. The fairing is needed in order to accommodate stowed landing gear, to house air conditioning units, for structural and aerodynamic reasons, and to protect the center fuel tank in the wing in the event of a landing with the landing gear not deployed. The fairing increases the fuselage cross-section at precisely the longitudinal station where it would be desirable to reduce the fuselage cross-section, i.e., at the wing-fuselage intersection. Consequently, at high subsonic flight Mach numbers (e.g., M=0.85 or above), the fairing contributes substantially toward overall aircraft drag.

On such an aircraft, area-ruling of other regions of the fuselage at the longitudinal stations corresponding to the wing's maximum cross-sectional area can be effective in lessening the deleterious impact of the fairing and the wing with respect to transonic drag. Area-ruling of the fuselage in the horizontal direction is not practical, however, because it leads to inefficiencies in the use of the space in the fuselage for passenger seating. Accordingly, it has been proposed to area-rule a passenger transport fuselage in the vertical direction. For instance, an aircraft is described in U.S. Pat. No. 5,992,797, assigned to the assignee of the present application and incorporated herein by reference, in which area-ruling of the upper portion of the fuselage above the wing is employed in order to achieve a reduction in aircraft drag at high subsonic Mach numbers. However, the resulting aircraft, although closer to an optimum cross-sectional area distribution than an equivalent aircraft without such area-ruling, is still far from such optimum area distribution. Accordingly, any measures that could be taken to get even closer to the optimum area distribution without sacrificing other important design considerations would obviously be desirable.

While this goal is easy to state, achieving it is difficult in practice because of the many countervailing design constraints. One very important constraint is the need to protect the center fuel tank of the aircraft in the event of a gear-up landing. In such a landing, the aircraft will essentially slide on its belly on the runway, thus bringing the center fuel tank into close proximity with the ground. There must be adequate structure between the ground and the tank to prevent the tank from rupturing. The fairing described above traditionally plays an important role in this regard. Thus, the problem becomes how to achieve a greater extent of area-ruling of the fuselage in the vicinity of the wing-fuselage intersection, in view of the traditionally required fairing and the need to maintain adequate passenger space.

SUMMARY OF THE INVENTION

The present invention addresses the above needs and achieves other advantages by providing an airframe structure in which area-ruling of the fuselage is accomplished at least partially by dishing or sculpting the fuselage in the keel area below the center portion of the wing that passes through the fuselage. The traditional fairing can be eliminated or can be reconfigured so that it does not detract from the objective of area-ruling. In order to provide the protection for the center fuel tank normally provided by the fairing, the invention in one embodiment employs portions of the fuselage keel located forward and aft of the dished or sculpted portion; contact between the fuselage in this region and the ground is prevented by the forward and aft portions of the fuselage. These forward and aft portions can be formed as "bumps" at the keel area of the fuselage. Advantageously, these keel bumps are located forward and aft of the longitudinal station at which the wing's maximum cross-sectional area occurs, and hence do not hinder the objective of providing area-ruling at that station. In another embodiment, the center fuel tank is protected by a keel beam running beneath the lower surface of the fuselage in the dished or sculpted region; the keel beam thus hangs out in the free stream air in this region. In this embodiment, the keel beam and keel bumps can both be used to protect the center fuel tank.

In accordance with the invention, any air conditioning or environmental control system that may be used on the aircraft can be located outside of the space below the center portion of the wing. For example, the environmental control system can be located in a lower portion of the fuselage forward of the wing. In another embodiment directed toward a double-decker aircraft, the aircraft has a main passenger seating deck and forward and aft upper passenger seating decks located above the main seating deck and separated by a middle section of the fuselage having no upper seating deck. In this embodiment, the environmental control system can be located in the middle section above the main passenger cabin between the forward and aft upper decks.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
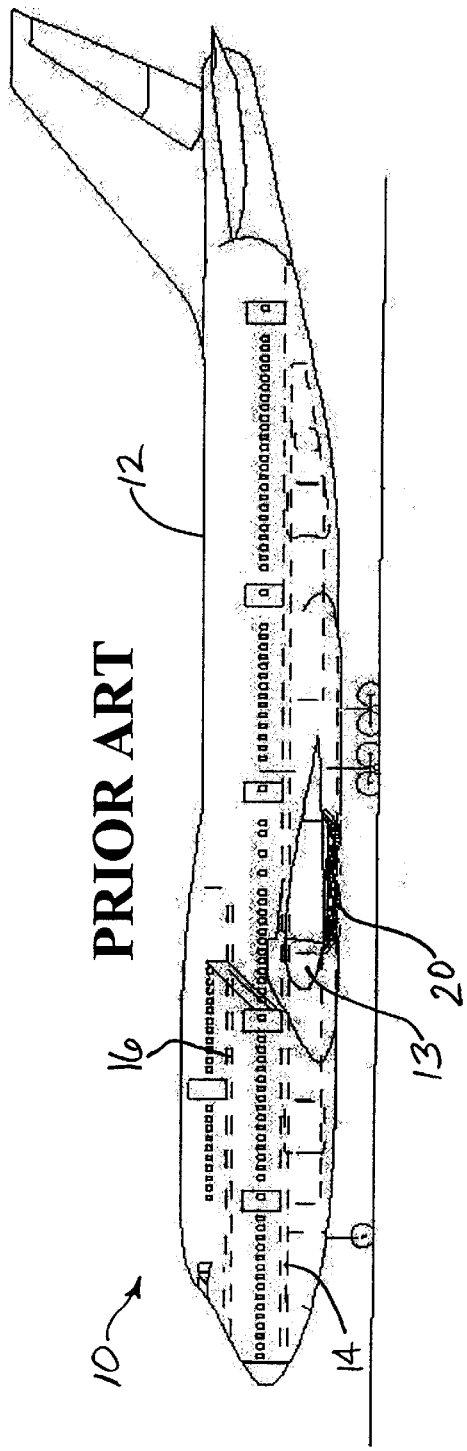
FIG. 1 is a schematic side elevation of a conventional passenger transport aircraft.
Figure 2:
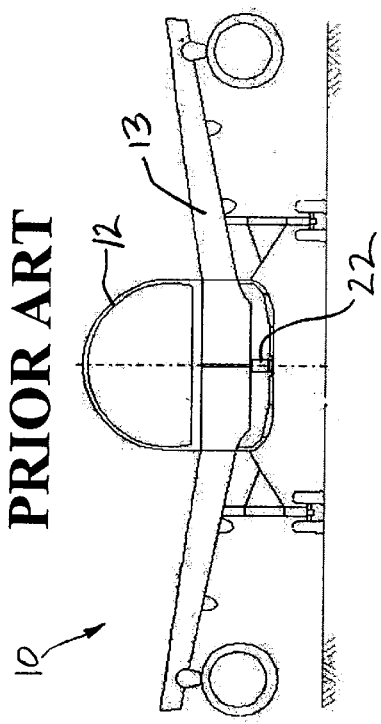
FIG. 2 is a front elevation of the aircraft of FIG. 1.

A conventional large passenger transport aircraft is depicted in FIGS. 1 and 2 and is denoted by reference numeral 10. The aircraft 10 has a fuselage 12 housing a main passenger seating deck 14 that extends for most of the length of the fuselage. The fuselage also houses an upper forward seating deck 16 that extends from just aft of the cockpit rearward to a station at or slightly forward of the center section of the wing 13.

As known in the art, the fuselage 12 is area-ruled such that the cross-sectional area of the fuselage in the portion of the fuselage forward of the wing 13 is larger than the cross-sectional area of the fuselage portion aft of the wing, and the area decreases in the region corresponding to the wing location. The objective is to achieve a distribution of cross sectional area versus longitudinal station that more closely approaches an optimum.

As background regarding the theory of area-ruling, an important aerodynamic consideration in designing aircraft for flight at high subsonic Mach numbers is to minimize wave drag, which is a type of pressure drag resulting from the formation of shock waves on aircraft surfaces. It has been shown that wave drag is related to changes in the aircraft's cross-sectional area in the longitudinal direction, also referred to as the "volume distribution" of the aircraft. Several advantageous body shapes have been found that tend to minimize wave drag, one of which is a Whitcomb body whose volume distribution is shown by the dashed line 15 in FIG. 8. It will be noted that the volume distribution is characterized by a smooth variation in the gradient or slope of the curve. Accordingly, it would be desirable from the standpoint of minimizing wave drag of an aircraft to design the aircraft so that its volume distribution approaches as closely as possible that of the Whitcomb body. Since the main contributors to the total cross-sectional area of an aircraft are the fuselage and wing, and in view of the fact that the wing's shape cannot be compromised to any significant extent, area-ruling of an aircraft typically is accomplished by tailoring the distribution of the fuselage's cross-sectional area so that the total aircraft cross-sectional area distribution more closely approaches the optimal distribution. A common approach used particularly in military fighter aircraft or the like is to reduce the width of the fuselage in the horizontal direction in the area of the wing, thus producing an hourglass shape often referred to as a "Coke bottle" shape. In passenger transport aircraft, however, this approach is undesirable because it leads to inefficient use of space.

Figure 8:
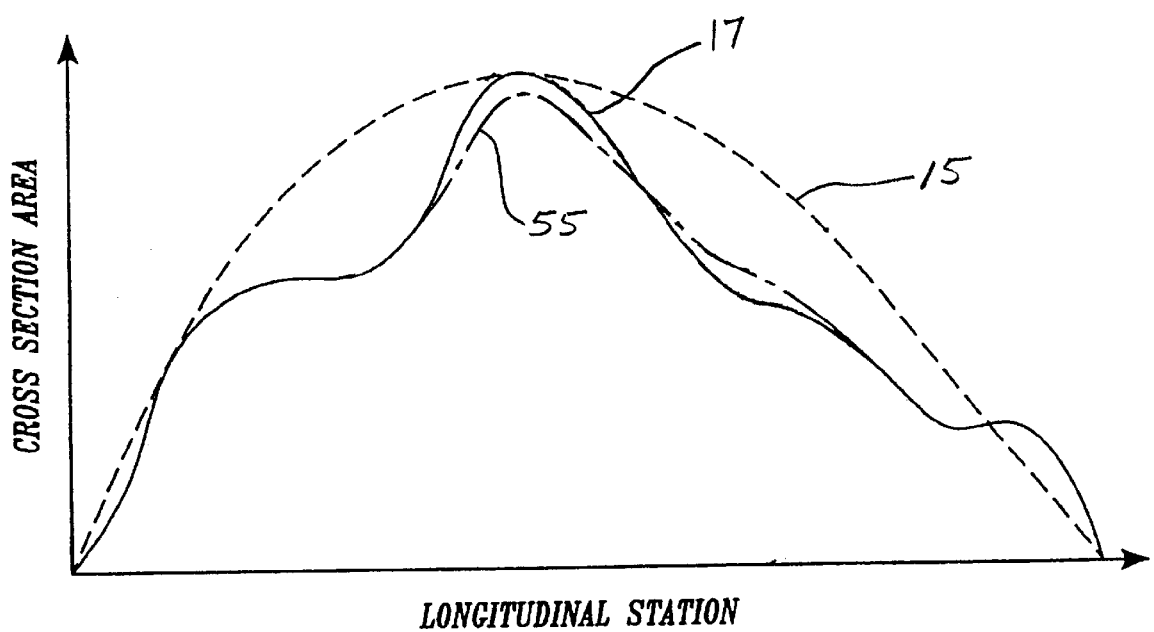
FIG. 8 is a plot of total aircraft cross-sectional area versus longitudinal station, comparing the aircraft of FIGS. 1 and 3 with an ideal Whitcomb body.

For this reason, it is common at least in large passenger transport aircraft such as the aircraft 10 in FIGS. 1 and 2 to accomplish the area-ruling not by reducing the fuselage area in the region of the wing but instead by increasing the fuselage area forward of the wing and then tapering the area in the wing region. This can allow the forward part of the fuselage to accommodate an upper deck as in the aircraft 10. Thus, increased capacity and area-ruling can be achieved at the same time. The solid line 17 in FIG. 8 shows the volume distribution for the aircraft 10.

The assignee of the present application, in U.S. Pat. No. 5,992,797, disclosed an approach particularly suitable for passenger transport aircraft, in which "Coke-bottling" of the fuselage is performed in a vertical plane rather than a horizontal plane. More particularly, the height of the fuselage above the wing center section is reduced. The '797 patent discloses an advantageous passenger aircraft having both forward and aft upper decks above the main seating deck, the forward and aft upper decks being separated by a center section in the area where the fuselage height is reduced. This allows a further increase in capacity while providing area-ruling.

The present invention represents an improvement to the technology disclosed in the '797 patent, but is also applicable to many types of aircraft beyond large dual-deck passenger aircraft. In accordance with the present invention, area-ruling of the fuselage is performed in the vertical plane similar to the '797 patent, but at least a substantial amount of the area-ruling is accomplished by dishing or sculpting the fuselage beneath the center section of the wing.

In a conventional aircraft such as the aircraft 10 of FIGS. 1 and 2, there are typically design constraints that would prevent such dishing or sculpting of the fuselage beneath the wing. For example, at least in passenger transport aircraft, it is common to locate the environmental control system (ECS) 20 in a space below the center section of the wing in a keel region of the fuselage. Thus, the space required for the ECS would prevent any significant degree of dishing of the fuselage beneath the wing. Additionally, at least passenger transport aircraft typically have a keel beam 22 (FIG. 2) that extends longitudinally along the keel region of the fuselage and typically passes beneath the center section of the wing. The keel beam 22 would prevent any significant dishing or area-ruling of the fuselage beneath the wing.

Figure 3:
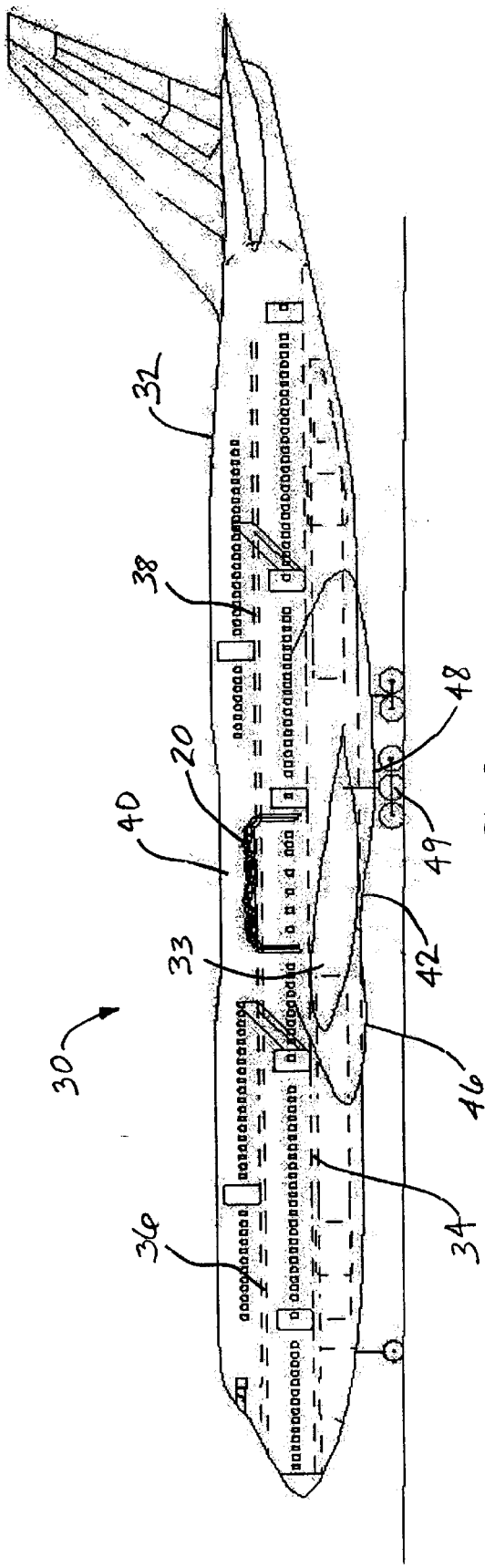
FIG. 3 is a schematic side elevation of an aircraft in accordance with one embodiment of the invention.
Figure 4:
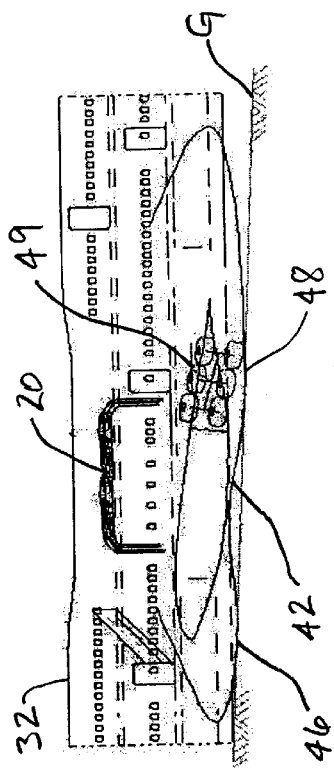
FIG. 4 is a fragmentary side elevation of the aircraft of FIG. 3, showing the aircraft executing a gear-up landing.
Figure 5:
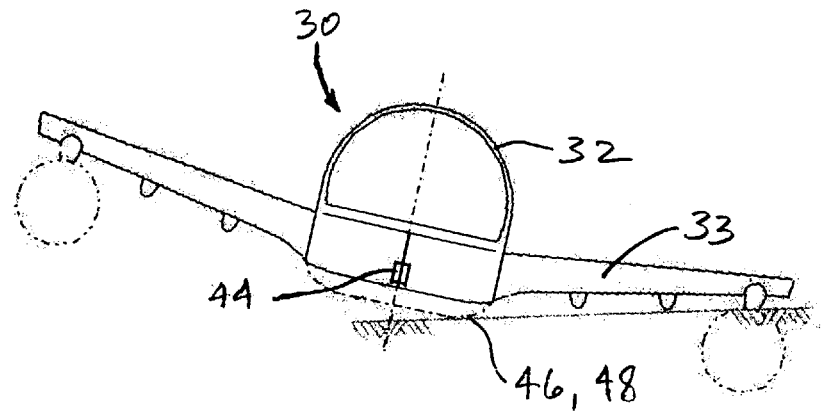
FIG. 5 is a front elevation of the aircraft of FIG. 3, showing the aircraft executing a gear-up landing with one wing down.

In accordance with the present invention, however, area-ruling or dishing of the fuselage beneath the wing of a passenger transport aircraft is accomplished by relocating such components that would ordinarily prevent such area-ruling. FIGS. 3 through 5 depict a first embodiment of a passenger transport aircraft 30 in accordance with the invention. The aircraft has a fuselage 32 housing a main passenger seating deck 34 extending substantially the length of the fuselage. The fuselage also houses a forward upper seating deck 36 and an aft upper seating deck 38. The forward upper deck 36 extends from just aft of the cockpit rearwardly to a station at or slightly forward of the wing 33. The aft upper deck 38 extends from just aft of the wing rearwardly to a point where the fuselage begins to taper in the tail region. A middle upper section 40 of the fuselage is located between the forward and aft upper decks and is preferably not available for passenger seating. In the illustrated embodiment, the middle upper section 40 isolates the forward upper deck from the aft upper deck such that these upper decks are non-adjoining. In this embodiment of the invention, the ECS 20 is installed in the middle upper section 40 of the fuselage adjacent to the sidewall, in an unpressurized compartment. Preferably, the height of the fuselage in the middle section between the upper decks 36, 38 is reduced relative to the rest of the fuselage so as to achieve area-ruling of the fuselage in the area corresponding to the location of maximum cross-sectional area of the wing 33.

Additional area-ruling is accomplished by dishing the fuselage beneath the wing as indicated at 42 in FIGS. 3 and 4. This is made possible by relocating the ECS as noted above, and by modifying the keel beam of the aircraft. In the first embodiment of FIGS. 3–5, the keel beam 44 is sculpted or contoured so that it is non-linear in the region of the center portion of the wing and the keel beam 44 in this region passes internally through the center portion of the wing. Accordingly, there is nothing below the center portion of the wing preventing the area-ruling of the fuselage in the vertical plane. The area-ruled region 42 of the fuselage beneath the wing is characterized by the waterline height of the fuselage in the area-ruled region 42 being greater than that in the keel region immediately forward and immediately aft of the area-ruled region 42. It is also characterized by the curvature of the area-ruled region 42 in the longitudinal direction being concave-downward over a substantial part of the length of the area-ruled portion.

The aircraft 30 includes a set of main landing gear 49. Preferably, as shown, the landing gear 49 is located aft of the area-ruled region 42.

In the first embodiment of FIGS. 3–5, protection is afforded to the center fuel tank (not shown) housed in the center section of the wing by providing the keel area of the fuselage with keel bumps. Thus, a forward keel bump 46 located just forward of the area-ruled region 42 projects downward to a substantially lower waterline height than the area-ruled region; likewise, an aft keel bump 48 just aft of the area-ruled region projects downward to a substantially lower waterline height than the area-ruled region. As shown in FIG. 4, when the aircraft is on the ground with the landing gear not deployed (e.g., in an abnormal gear-up landing caused by failure of the gear to deploy and/or lock), the keel bumps 46, 48 contact the ground G and prevent contact between the ground and the center section of the wing. Even if the aircraft lands with one wing down such as when the gear on that side fails to lock while the gear on the other side is down and locked, the keel bumps protect the center section of the wing against ground contact, as shown in FIG. 5.

Figure 6:
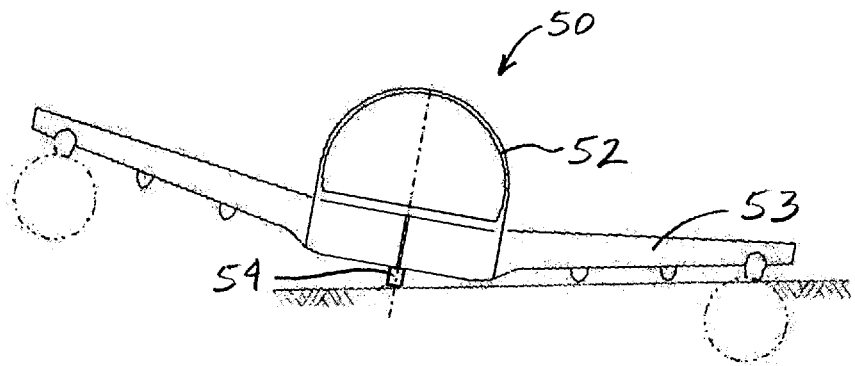
FIG. 6 depicts an aircraft in accordance with an alternative embodiment of the invention, executing a gear-up landing with one wing down.

FIG. 6 depicts an alternative embodiment of an aircraft 50 in which protection of the center section of the wing is provided by locating the keel beam 54 below the center section of the wing. Preferably, the keel beam 54 runs below the lower aerodynamic surface of the fuselage 52 in the region of the area-ruling; thus, the keel beam in this region hangs out in the free stream. Unlike the previously described embodiment, the keel beam 54 can be a conventional straight beam. It is possible to include both the keel bumps and the keel beam for protecting the center fuel tank in the wing.

Figure 7:
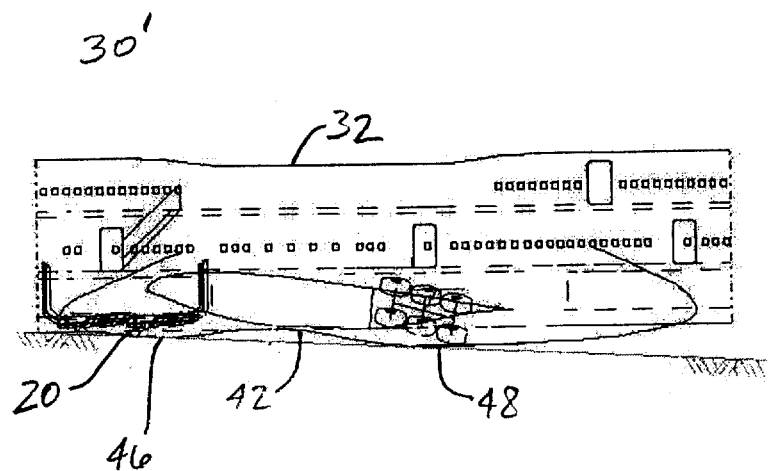
FIG. 7 is a view similar to FIG. 4, showing an alternative embodiment with the environmental control system relocated.

FIG. 7 illustrates yet another embodiment of the invention in which the aircraft 30' is generally similar to the aircraft 30 previously described and depicted in FIGS. 3–5, except that the ECS 20 is located in a lower keel region of the fuselage 32 just forward of the wing, i.e., generally in the region of the forward keel bump 46.

The invention facilitates an increased degree of area-ruling compared with conventional aircraft. FIG. 8 shows the volume distribution 55 of the aircraft of FIGS. 3–7. It can be seen that the volume distribution is closer to the optimum Whitcomb distribution 15 than is the case for the conventional aircraft represented by the curve 17. Accordingly, the invention facilitates a reduction in wave drag for the aircraft.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An airframe for a passenger transport aircraft, comprising:
    a wing extending transverse to a longitudinal direction of the airframe;
    a fuselage formed as a generally tubular structure extending lengthwise along the longitudinal direction of the airframe, the fuselage defining a lower keel portion having a lower aerodynamic surface, wherein the fuselage includes a structural keel beam that extends longitudinally along the keel portion of the fuselage from the forward portion to the aft portion of the fuselage for stiffening the fuselage in longitudinal bending;
    wherein the wing includes a center portion that passes transversely through the fuselage above the keel portion, the fuselage having forward and aft portions respectively located forward and aft of the center portion of the wing; and
    wherein the lower aerodynamic surface of the keel portion in the vicinity of the wing is area-ruled such that a waterline height of said lower aerodynamic surface is greater below the wing than in the forward and aft portions of the fuselage immediately ahead of and behind the wing and the waterline height of said lower aerodynamic surface varies in the longitudinal direction so as to account for varying cross-sectional area of the wing in the longitudinal direction.

2. The airframe of claim 1, wherein the keel beam includes a portion that passes through a lower part of the center portion of the wing.

3. The airframe of claim 2, wherein the portion of the keel beam that passes through the center portion of the wing is sculptured to be non-linear.

4. The airframe of claim 1, wherein the keel beam includes a portion that passes beneath the center portion of the wing.

5. The airframe of claim 4, wherein the portion of the keel beam passing beneath the center portion of the wing is located below the area-ruled lower aerodynamic surface of the fuselage.

6. An airframe for a passenger transport aircraft, comprising:
   a wing extending transverse to a longitudinal direction of the airframe;
   a fuselage formed as a generally tubular structure extending lengthwise along the longitudinal direction of the airframe, the fuselage defining a lower keel portion having a lower aerodynamic surface;
   wherein the wing includes a center portion that passes transversely through the fuselage above the keel portion, the fuselage having forward and aft portions respectively located forward and aft of the center portion of the wing;
   wherein the lower aerodynamic surface of the keel portion in the vicinity of the wing is area-ruled such that a waterline height of said lower aerodynamic surface is greater below the wing than in the forward and aft portions of the fuselage immediately ahead of and behind the wing and the waterline height of said lower aerodynamic surface varies in the longitudinal direction so as to account for varying cross-sectional area of the wing in the longitudinal direction; and
   an environmental control system located in the fuselage outside of an area below the center portion of the wing.

7. The airframe of claim 6, wherein the fuselage includes a passenger seating deck located above the center portion of the wing, and the environmental control system is located in the fuselage above the passenger seating deck.

8. The airframe of claim 6, wherein the environmental control system is located in a lower portion of the fuselage forward of the center portion of the wing.

9. An airframe for a passenger transport aircraft, comprising:
   a wing extending transverse to a longitudinal direction of the airframe;
   a fuselage formed as a generally tubular structure extending lengthwise along the longitudinal direction of the airframe, the fuselage defining a lower keel portion, the fuselage including a main passenger seating deck and forward and aft upper passenger seating decks located above the main passenger seating deck, a center portion of the fuselage being located longitudinally between the forward and aft upper passenger seating decks, wherein the fuselage includes a structural keel beam that extends longitudinally along the keel portion of the fuselage from the forward portion to the aft portion of the fuselage for stiffening the fuselage in longitudinal bending, and the keel beam include sa portion that passes through a lower part of a center portion of the wing;
   wherein the center portion of the wing passes transversely through the center portion of the fuselage above the keel portion, the fuselage having forward and aft portions respectively located forward and aft of the center portion of the wing; and
   wherein the fuselage in the vicinity of the center portion of the wing is area-ruled to reduce a cross-sectional area of the fuselage relative to that of the forward and aft portions of the fuselage so as to account for presence of the wing, at least a substantial part of the area-ruling of the fuselage being accomplished by dishing a lower aerodynamic surface of the fuselage directly below the center portion of the wing such that said lower aerodynamic surface below the wing has a concave-downward curvature in the longitudinal direction.

10. An airframe for a passenger transport aircraft, comprising:
    a wing extending transverse to a longitudinal direction of the airframe;
    a fuselage formed as a generally tubular structure extending lengthwise along the longitudinal direction of the airframe, the fuselage defining a lower keel portion, the fuselage including a main passenger seating deck and forward and aft upper passenger seating decks located above the main passenger seating deck, a center portion of the fuselage being located longitudinally between the forward and aft upper passenger seating decks;
    wherein the wing includes a center portion that passes transversely through the center portion of the fuselage above the keel portion, the fuselage having forward and aft portions respectively located forward and aft of the center portion of the wing;
    wherein the fuselage in the vicinity of the center portion of the wing is area-ruled to reduce a cross-sectional area of the fuselage relative to that of the forward and aft portions of the fuselage so as to account for presence of the wing, at least a substantial part of the area-ruling of the fuselage being accomplished by dishing a lower aerodynamic surface of the fuselage directly below the center portion of the wing such that said lower aerodynamic surface below the wing has a concave-downward curvature in the longitudinal direction;
    wherein the fuselage includes a structural keel beam that extends longitudinally along the keel portion of the fuselage from the forward portion to the aft portion of the fuselage for stiffening the fuselage in longitudinal bending, and the keel beam includes a portion that passes beneath the lower aerodynamic surface of the fuselage below the center portion of the wing.

11. An airframe for a passenger transport aircraft, comprising:
    a wing extending transverse to a longitudinal direction of the airframe;
    a fuselage formed as a generally tubular structure extending lengthwise along the longitudinal direction of the airframe, the fuselage defining a lower keel portion, the fuselage including a main passenger seating deck and forward and aft upper passenger seating decks located above the main passenger seating deck, a center portion of the fuselage being located longitudinally between the forward and aft upper passenger seating decks;
    wherein the wing includes a center portion that passes transversely through the center portion of the fuselage above the keel portion, the fuselage having forward and aft portions respectively located forward and aft of the center portion of the wing;
    wherein the fuselage in the vicinity of the center portion of the wing is area-ruled to reduce a cross-sectional area of the fuselage relative to that of the forward and aft portions of the fuselage so as to account for presence of the wing, at least a substantial part of the area-ruling of the fuselage being-accomplished by dishing a lower aerodynamic surface of the fuselage directly below the center portion of the wing such that said lower aerodynamic surface below the wing has a concave-downward curvature in the longitudinal direction;

wherein the keel portion of the fuselage defines downwardly protruding forward and aft keel bumps located respectively forward and aft of the center portion of the wing and configured to engage the ground during a gear-up landing and prevent contact between the ground and the center portion of the wing.